United States Patent Office 3,444,081
Patented May 13, 1969

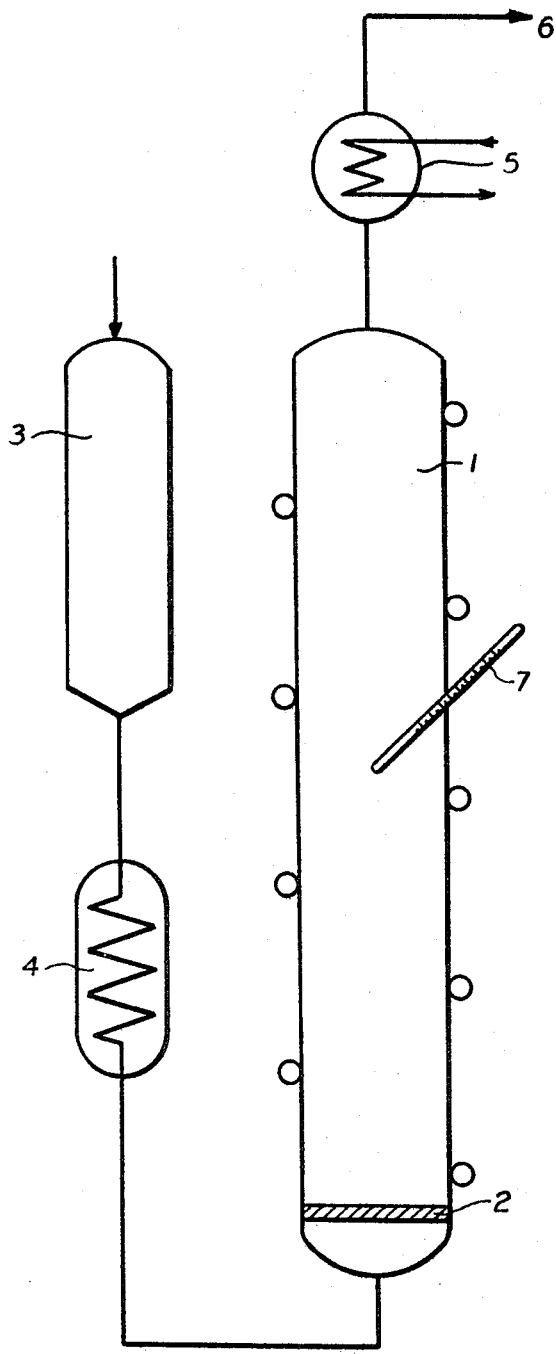

3,444,081
SYNTHETIC LUBRICANTS ON THE BASIS OF DIORTHOSILICIC ACID ESTERS
Herbert Göthel, Oberhausen-Sterkrade, and Hans Feichtinger, Dinslaken, Germany, assignors to Ruhrchemie Aktiengesellschaft, Oberhausen-Holten, Germany, a corporation of Germany
Filed July 27, 1966, Ser. No. 568,272
Int. Cl. C10m 1/52, 3/46, 5/26
U.S. Cl. 252—49.6     10 Claims

ABSTRACT OF THE DISCLOSURE

A diorthosilicic acid ester of the formula:

$$A-(OSi)_2-(OR)_{6-(n+m)}(OR')_n(OR'')_m$$

in which A represents a pentaerythrite-dicarboxylic-acid ester or di-pentaerythrite-tetra-carboxylic-acid ester radical suitable for use as a lubricant for extremely high performance aircraft jet engines.

---

This invention relates to new and useful synthetic liquid compositions or oils. More particularly the invention is concerned with liquid or oily compositions comprising a diorthosilicic acid ester or a mixture containing a diorthosilic acid ester.

Three types of esters were hitherto used as lubricants for jet power aircraft engines. The three types of esters are derived from dibasic carboxylic acids and are classified as follows:

Type 1.—(3 cst. oils, viscosity above 3 cst. at 98.9° C.) comprising esters of dibasic acids and primary branched alcohols. These esters correspond to the standard specification "Military Specification Lubricating Oil, Aircraft Turbine Engine, Synthetic Base," Nov. 9, 1949 ("Mil–L–7808 D"). These Type I oils are suitable for use in turbine-jet-propulsion units having flying speeds of up to 1 Mach (1 Mach=velocity of sound).

Type 2.—(7.5 cst. oils) comprising 3 cst. oils with additives in the form of complex esters, obtained by reaction of semi-esters of dibasic acids and monovalent alcohols with polyols (polyglycols) or of semi-esters of glycols and monobasic acids with dibasic acids. The Type 2 oils correspond to the British specification "Directorial of Engine Research and Development Material Specif." May 16, 1960 ("DERD 2487"). The Type 2 oils are suitable for use in turbo-prop engines.

Type 3.—Comprising esters of methylols, as, for instance, neopentylglycol, trimethylolpropane or pentaerythrite, i.e., the so-called "stabilized esters." Due to their high thermal and oxidative stability, they can be employed in supersonic aircraft engines having flying speed rates of about Mach 2.

Lubricating oils for use in jet propulsion aircraft engines must meet the demands of a broad temperature range. This temperature range is continually being extended due to the continuing developmental work in the field of supersonic aircraft engines having flying speed rates above Mach 2. Lubricants for aircraft engines having flying speeds of up to Mach 3 and oil circulating temperatures of 200 to 260° C. must be on the one hand flowable at −55° C., in order to allow low temperature starting of the oil pumps at great heights but also must withstand temperatures of 400° C. and even higher, which temperatures are reached at hot points of the engine without undergoing thermal or oxidative decomposition; that is, the lubricating oils must be capable of heavy duty service under varying operating conditions. They must be characterized by small changes in viscosity with temperature remaining fluid at low temperatures, be non-volatile at high temperatures, have high thermal and oxidative stability, and the lubricating films formed therefrom must have adequate low carrying capacities.

Some of the Type 3 esters can withstand the permanent high temperatures prevailing in the turbine layers, as their range of application lies some 50 to 100° C. above that of the oils of Types 1 and 2, but their viscosity-temperature-responsivity with viscosity indices below 100 is unfavorable. Attempts have been made to improve the viscosity-temperature-relationship of these esters by the addition of thermally resistant silicones or halogenated silicones. However, the first-named compositions exhibit poor lubricating properties, while the latter compositions are corrosive. The known high temperature-stable lubricating agents as, for example, polyphenylethers and substituted pyrazines are not suitable in connection with jet propulsion aircraft engines as they are not flowable at temperatures below 0° C. The need for lubricants or additives for lubricants which are not only characterized by an excellent high temperature responsivity and a satisfactory flowability at extremely low temperatures but which also are possessed of good lubricating powers over a broad temperature range, accordingly has existed up until the present invention.

It is an object of this invention to overcome the difficulties encountered in the art and to provide silicic acid esters suitable as lubricants or as additives to lubricants, which meet the requirements, i.e., high boiling ranges, low volatilities, high viscosity indices, low viscosities at low temperatures and which are capable of forming lubricating films having satisfactory load carrying capacities and which do not exhibit the drawbacks of the hitherto known ortho- and disilicic acid esters.

Another object of this invention is to provide liquid compositions suitable for use as lubricating oils in jet propulsion aircraft.

Still another object of this invention is to provide liquid compositions suitable for use as lubricants comprising pentaerythrite carboxylic acid-diorthosilicic acid esters per se or in admixture with other lubricants.

These and other objects will be apparent from a consideration of the instant disclosure and claims appended hereto.

In accordance with the present invention, it has now been found that liquid materials comprising diorthosilicic acid esters of the formula:

$$A-(OSi)_2-(OR)_{6-(n+m)}(OR')_n(OR'')_m$$

wherein A represents a pentaerythrite-dicarboxylic-acid ester or di-pentaerythrite-tetra-carboxylic-acid ester radical, R represents a polyoxyalkyleneglycol ether radical having 1 to 4 ether-oxygen atoms, R' represent an alkyl group having more than three carbon atoms, R" represents a monopentaerythrite-tri-carboxylic-acid ester radical or a dipentaerythrite-pentacarboxylic-acid ester radical, n has a value of 0 to 6 and m has a value of 0 to 2 and wherein the carboxylic acid constituents of the A- and R"-radicals are derived from saturated monocarboxylic acids having more than two carbon atoms and wherein R, R' and R" may be the same or different, provide liquid compositions suitable for use as lubricants in jet propulsion aircraft. The diorthosilicic acid esters of the above formula correspond to the following formulae depending on whether a pentaerythrite-dicarboxylic acid ester or di-pentaerythrite-tetracarboxylic acid ester is involved:

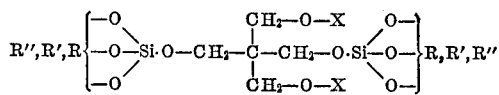

and

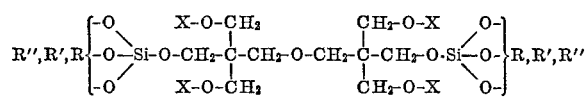

R' and R" having the same meaning as set out previously and X representing saturated acyl of more than 2 carbon atoms.

The liquid compositions of this invention may be used alone or admixed with other liquid materials, e.g., conventional fluid bodies suitable for use as lubricants as well as with the conventional fluid body additives, i.e., antioxidants, etc.

In accordance with the invention, diorthosilicic acid ester wherein both $n$ and $m$ are 0, or $n$ is 3 and $m$ is 0, or $n$ is 2 or 3 and $m$ is 1 or 2, but where $n+m$ are not more than 4, constitute broadly preferred diorthosilicic acid esters.

An especially preferred group of esters for the purposes of the invention are esters, wherein the A-groups are pentaerythrite - di - (3,5,5 - trimethylhexanate) - or - (2-ethylhexanate) radicals, the R-groups are diethyleneglycol-n-butylether-radicals in which trimethylhexanate can also be designated as an isononate group the R'-groups are alkyl groups having 8 and more carbon atoms, preferably isodecyl-groups, and the R"-groups are pentaerythrite-tri-(3,5,5-trimethylhexanate)-radicals.

The diorthosilicic acid esters according to the invention have hitherto not been described. They may be prepared by the conventional methods employed for the production of diorthosilicic acid esters as known in the art, as, for instance, by reacting stoichiometric amounts of corresponding water-free alcohols, ether alcohols and pentaerythrite-di- or -tri-isononanate having one or two free hydroxyl groups with gaseous silicon tetrachloride as disclosed in German Patent 1,142,855, or as disclosed in German patent application R 32,696 IVb/12o, German Auslegeschrift 1,180,359.

The starting materials for the A- and R"-group for instance may be prepared by esterification of one mole of pentaerythrite with two or three moles of 3,5,5-trimethylhexanoic acid followed by distillative recovery of the reaction products. Pentaerythrite-di-isononanate, pentaerythrite-tri- and pentaerythrite-tetra-isomonanate are thereby obtained. Insoluble pentaerythrite-monoisononanate, which at first is formed as a by-product and can be separated by filtration, is continuously recycled for further reaction.

3,5,5-trimethylhexanoic acid and 2-ethylhexanoic acid can advantageously be prepared by hydroformylation (oxo-synthesis) of suitable olefins, followed by air oxidation of the reaction products.

The advantages and properties of the novel diorthosilicic acid esters of the invention as lubricants are shown in the following Tables I and II wherein a comparison of certain of the esters of the invention with certain known silicic acid esters has been set out.

The esters of the invention used in the comparison and listed in Tables I and II are the following:

I.—Pentaerythrite - di - 3,5,5 - trimethylhexanate - di-ortho - silicic acid - hexa - isodecyl - ester, II.—Pentaerythrite - di - 3,5,5 - trimethylhexanate - di-ortho - silicic acid - hexa - (diethyleneglycol - n - butylether) - ester, III.—Pentaerythrite - di - 3,5,5 - trimethylhexanate - di-ortho - silicic acid - tri - [diethyleneglycol - n - butylether] - tri - [isodecyl] - ester, IV.—Pentaerythrite - di - 3,5,5 - trimethylhexanate - di-orthosilicic acid - di - [pentaerythrite - tri - (3,5,5-trimethylhexanate)] - tetra - [diethyleneglycol - n-butylether] - ester, V.—Pentaerythrite - di - 3,5,5 - trimethylhexanate - di-orthosilicic acid - mono - [pentaerythrite - tri - (3,5,5-trimethylhexanate)] - penta - [diethyleneglycol - n-butylether] - ester, VI.—Pentaerythrite - di - 3,5,5 - trimethylhexanate - di-orthosilicic acid - mono - [pentaerythrite - tri - (3,5,5-trimethylhexanate)] - tri - [diethyleneglycol - n - butylether] - di - (isodecyl) - ester, VII.—Pentaerythrite - di - 3,5,5 - trimethylhexanate - di-orthosilicic acid - mono - [pentaerythrite - tri - (3,5,5-trimethylhexanate)] - tri - (isodecyl) - di - (diethyleneglycol - n - butylether) - ester.

These esters are prepared in a so-called "bubble column reactor" at temperatures of 67 to 75° C. and by following the process disclosed in German patent application R 32,696 IVb/12o, German Auslegeschrift 1,180,359.

The high molecular weight diorthosilicic acid esters according to the invention boil above 270° C. at one torr, above 210° C. at 0.01 torr and at 490° C. at 760 torr. Their flash points range above 275° C.

Esters according to the invention having comparatively high viscosities and being characterized by small changes in viscosity with temperature are evaluated according to their viscosity properties by comparison with lubricants known in the art, in which connection in addition to the viscosity index, the viscosity-temperature constant (VTC) is taken into consideration as a standard of value.

As can be seen from Table I in comparison to the complex esters of type 2 as known in the art, and whose average values are also listed in Table I, the esters I to III of the invention possess a higher viscosity. The temperature responsivities are about equal, although ester II possesses more favorable properties than the known materials. If the esters according to the invention are used, instead of the complex esters known in the art, as viscosity-increasing additives for commercial dibasic esters, in the preparation of 7.5 cst.-oils according to DERD 2487, an equal or even a better effect is attained with addition of smaller amounts due to the higher viscosity of these esters.

TABLE I

| | Molecular weight | Density, $d_4^{20}$ | Viscosity in cst. in ° C. 98.9 | Viscosity in cst. in ° C. 37.8 | Viscosity Index | VTC [3] | Setting point, ° C. | flame point, ° C. | Boiling behavior DIN 51751, 51567 boiling temp. 1° C. | Boiling behavior DIN 51751, 51567 boiling temp. Torr 0.01 ° C. | Boiling behavior DIN 51751, 51567 boiling temp. 10 Vol percent, 760° C. |
|---|---|---|---|---|---|---|---|---|---|---|---|
| Pentaerythrite-diisononanate-diorthosilicic acid ester: | | | | | | | | | | | |
| No. I | 1,412 | 0.944 | 18.0 | 113 | 141 | 0.835 | −55 | 275 | 273 | 210 | 493 |
| No. II | 1,436 | 1.055 | 15.0 | 69.3 | 155 | 0.784 | −56 | 280 | 286 | 228 | 502 |
| No. III | 1,424 | 1.02 | 23.3 | 125.5 | 146 | 0.813 | −50 | 275 | 282 | 225 | 497 |
| No. IV | 2,224 | 0.991 | 34.05 | 310 | 128 | 0.890 | −38 | 293 | | | |
| No. V | 1,830 | 1.027 | 30.4 | 235 | 132.5 | 0.873 | −41 | 302 | 306 | 251 | 528 |
| No. VI | 1,822 | 1.001 | 27.0 | 241.1 | 127 | 0.888 | −32 | 295 | 308 | 252 | 530 |
| No. VII | 1,818 | 1.018 | 40.5 | 403 | 125 | 0.899 | −30 | 300 | 310 | 254 | 533 |
| Esters compared therewith: | | | | | | | | | | | |
| Average values of complex esters + [1] | 780 | 1.10 | 10.4 | 52.2 | 153 | 0.801 | −52 | 250 | | | |
| Phenyl-methyl-siliconoil A mol ratio | [2] 0.75 | 1.115 | 48 | 300 | 136 | 0.84 | −22 | 290 | | | |
| Phenyl-methyl-siliconoil B phenyl to methyl group | [2] 1.3 | 1.12 | 16 | 230 | 73 | 0.93 | −12 | 300 | | | |

[1] Gunderson, Hart, Synthetic Lubricants, Reinhold P. Corp., New York, 1962, p. 197.   [2] Gunderson, Hart, Synthetic Lubricants, p. 275, and Noll, Verlag Chemie, 1960, pp. 291 and 292.   [3] Viscosity Temperature Coefficient.

The diorthosilicic acid esters IV to VII having pentaerythrite-tri-isononanate radicals as substituents are comparable with methyl-phenyl-silicone oils but have improved heat stabilities and their tendency to cross-linking or gel formation is reduced by substitution of the phenyl groups in the molecule. The viscosity values, the ability of the films to hold, and the thermal stability of pentaerythrite-di-isononanate-diorthosilicic acid esters IV to VII not only attain the corresponding values of low-phenylated methyl-phenyl-silicone oils as known in the art but, in several instances, surmount the same as is seen from a comparison of the values listed in Table I.

Due to their high viscosity, the diorthosilicic acid esters according to the invention exhibit outstanding low temperature characteristics. The setting points set out in Table I depend on the high viscosity of the esters and are not caused by solid deposits.

Generally, the oxidative stability of the pentaerythrite-di-isononanate-diorthosilicic acid-esters according to the invention is better than that of ester oils of types 1, 2 and 3 as known in the art.

The high boiling esters according to the invention are surprisingly heat-stable; no gel formation occurs by heating above 300° C. in the presence of air. The esters according to the invention consisting of R-substituents having eight and more carbon atoms are water-resistant, especially in the case of a steric shielding of the SiOC-linkage.

The oil films formed of the diorthosilicic acid esters according to the invention further possess an extremely high load carrying capacity, the criterion therefor being the so-called "welding value" which amounts to 170/180 kg. This welding value was determined by means of the four-ball apparatus, as described by Boerlage (Lexikon der Schmiertechnik, G. Voegtle, Franckh'sche Verlagshandlung Stuttgart, 1964). In Tables II and III, which follow, two numbers are set out under the column heading "Welding Value." The first number represents the highest possible load in kg. which the lubricating film being tested withstands for one minute without alteration, while the second number designates the load at which the balls are welded, i.e., frozen, together. In Table II, the welding values of some esters according to the invention are set out in comparison with the welding values of dibasic esters of types 1 to 3, of methyl-phenyl and of mineral oil lubricants. It can be seen therefrom that the welding values of the thermally stable and oxidation stable diorthosilicic acid esters according to the invention surpass those of the oils used in the comparison.

TABLE II.—WELDING VALUES OF PENTAERYTHRITE-DI-ISONONANATE-DIORTHOSILICIC ACID ESTERS DETERMINED IN THE FOUR-BALL APPARATUS

| Ester | Welding value load in kg. |
|---|---|
| Pentaerythrite-diisononanate-diorthosilicic acid ester: | |
| No. I | 170/180 |
| No. II | 170/180 |
| No. III | 170/180 |
| No. IV | 170/180 |
| No. V | 170/180 |
| No. VI | 170/180 |
| No. VII | 170/180 |
| Diabasic ester, type 1 (3–3.6 cst.) | 150/160 |
| Complex esters, type 2 (10.4 cst.) | 160/170 |
| Stabilized esters, type 3: | |
| A (4 cst.) | 150/160 |
| B (11 cst.) at 98.8° C | 160/170 |
| Non-alloyed mineral lubricating oil (11 cst.) | 150/160 |
| Silicone oil (48 cst.) | 120/130 |

The esters of this invention can be used alone or in admixture with other liquid materials known in the art as lubricants. Depending on their viscosity, the pentaerythrite-di-isononanate-diorthosilicic acid esters according to the invention can be admixed in any ratio, but advantageously with up to 75% by volume with other fluid bodies known in the art as lubricants, as for instance with mineral lubricating oils, dicarboxylic acid esters, as for instance sebacic acid esters, especially bis-(2-aethylhexyl)-sebacat, organosilicium compounds of different structure, as for instance polydimethylsiloxanes, polyphenylether oils and phosphoric acid esters. Due to their oxidative stability, prolonged thermal stability, lubricating power and viscosity values including their flowability at low temperatures the esters according to the invention improve the properties of the lubricating components admixed therewith. They are active over an extremely broad temperature range, i.e., stable, capable of lubrication, sufficiently viscous at high temperatures and yet flowable at low temperatures.

The esters according to the invention can be used as oxidation stable thickening agents for the preparation of 7.5 cst. oils instead of the complex esters known in the art. Depending on their viscosity, the esters of the invention are generally used in amounts ranging from 25 to 75 volume percent, referred to the total quantity of the resulting admixture.

Due to their viscosity- and low-temperature-characteristics the heat-stable esters according to the invention represent ideal components for admixture with stabilized dibasic esters, and namely with esters of type 3, whose viscosity index values range partially below 100.

The pentaerythrite-di-disononanate-diorthosilicic acid esters according to the invention, which are in part highly viscous, can also advantageously be admixed with high boiling diorthosilicic acid esters having low viscosities, as for instance with the diethyleneglycol-diorthosilicic acid-(polyoxyalkylene-glycol-ether)-esters according to the disclosure of U.S. patent application Ser. No. 470,629 (now U.S. Patent No. 3,336,227). The silicic acid ester mixtures thereby obtained possess a viscosity-temperature relationship with VI values above 150, lower viscosities at low temperatures, low setting points and extremely favorable abrasion and welding values. They are well suited as lubricants with a broad range of application at extremely high temperatures prevailing in turbine engines.

The following examples are illustrative but not limitative of the invention:

EXAMPLE I

A reaction vessel 1 (as shown in the attached drawing) (a so-called bubble-column reactor) and which consisted of a vertical glass tube having an internal diameter of 69 mm. and a height of 550 mm., provided with a glass frit 2 (Jena apparatus glass, grain coarseness 2) at its lower end and equipped with a thermometer 7, was charged with 333 g. pentaerythrite-di-isononanate as hydroxy-ester, 417 g. isodecanol and 427 g. diethyleneglycol-n-butylether. All of the materials charged had previously been dried to a water content below 0.1%. Silicon tetrachloride was then introduced in dropwise fashion from a dosing vessel 3 into an evaporator coil 4 heated to 80° C. The coil 4 was connected so as to be gastight with the reaction vessel 1, by a conduit joining to the reaction vessel 1 below the said glass frit 2. The silicon tetrachloride vapors evolved in the evaporator coil 4 were sucked through the frit 2 under a vacuum of 180 torr via conduit 6 equipped with a condenser 5. The ascending SiCl$_4$ vapors together with the hydrogen chloride evolved during the reaction formed a bubble column of about 400 mm. height with the liquid in the reaction vessel 1. The liquid reaction mixture, which had been preheated to 40° C., was heated up to 49° C. by the heat of reaction. 272 g. SiCl$_4$ were introduced and converted during 90 minutes. After termination of the reaction, the reaction vessel 1 was heated at 110° C. for two hours, whereby dissolved hydrogen chloride was removed from the reaction mixture under introduction of nitrogen at a vacuum of 20 torr. Following this treatment, the Beilstein reaction was negative. Thereafter, the nonreacted excess amounts of the reactants (132 g.) were distilled off from the reaction product under a vacuum of 0.01 torr up to a temperature of 225° C. As distillation residue 1,105 g. pentaerythrite-di-isononanate-diorthosilicic acid-tri-(diethyleneglycol-n-butylether)-tri-(isodecyl)-ester (ester III) which has a density $d_4^{20}=1.02$ was obtained. The viscosity of the ester at 98.9° C. was 23.2 cst., at 37.8° C., 125.5 cst.; the viscosity index amounted to 146; the viscosity-temperature constant was 0.813; the flame point came to 275° C.; the silicon content of the product ester amounted to 4.02% (calculated 3.94%).

EXAMPLE II

A so-called "bubble column" reaction vessel 1 (as shown in the attached drawing) consisting of a vertical glass tube having an interior diameter of 63 mm. and a height of 480 mm. provided with a glass frit 2 (Jena apparatus glass, coarseness 2) at its lowermost end was charged with a mixture consisting of 208 g. pentaery-thrite-di-isononanate, 278 g. pentaerythrite-tri-isononanate, 243 g. diethyleneglycol-n-butylether and 158 g. isodecanol, which had previously been carefully dried. From a dosing vessel 3, 170 g. silicon tetrachloride was introduced dropwise into evaporator coil 4, which was joined so as to form a gastight connection with reaction vessel 1 by a conduit located below frit 2. The SiCl₄ vapors were sucked through frit 2 under a vacuum of 180 torr into the reaction vessel 1. The liquid mixture, preheated to 40° C. was heated at 56° C. by the reaction heat evolved in the bubble column formed in reaction vessel 1 by the ascending vapors of silicon tetrachloride and hydrogen chloride evolved during the reaction together with the liquid reactants. The reaction was complete after 100 minutes. Hydrogen chloride dissolved during the reaction was removed at a vacuum of 20 torr under introduction of nitrogen from the reaction mixture heated to 110° C. Thereafter, the Beilstein reaction was negative. The non-reacted excess liquid components (110 g.) were distilled off at 0.01 torr under heating up to 252° C. As distillation residue, 863 g. pentaerythrite-di-isononanate - diorthosilicic-acid - [pentaerythrite - tri - isononanate] - tri - (diethyleneglycol - n - butylether) - di - (isodecyl) - ester (ester VI) having the following properties were obtained: Density $d_4^{20}=1.001$; viscosity at 98.9° C.=27.0 cst., at 37.8° C.=241.1 cst.; viscosity index=127; viscosity temperature constant 0.888; setting point ranging at −30° C.; flame point ranging at 195° C.; silicon content 3.18% (calculated 3.08%).

EXAMPLE III

A dibasic ester, bis-(isodecyl)-adipate, was mixed with pentaerythrite-di-isononate - diorthosilicic acid-tri-(diethyleneglycol-n-butylether) - tri - (isodecyl)-ester (ester III) in a ratio of 55:45% by volume. The said ester mixture (in the following called "mixture 55/45") was suitable for use as a standard lubricant for propeller-turbine-jet-propulsion engines. Its properties are set out in comparison with those of its starting components in Table III which follows.

EXAMPLE IV

The highly viscous ester VI according to the invention, pentaerythrite - di - isononanate - diorthosilicic acid-mono - [pentaerythrite - tri - isononanate] - tri - [diethyleneglycol-n-butylether] - tri - (isodecyl) - ester was mixed with the lower viscous diethyleneglycoldiorthosilicic acid-hexa-(diethyleneglycol-n-butyl-ether)-ester (ester A) and diethyleneglycol - diorthosilicic acid-hexa-(ethyleneglycol-n - butylether) - ester (ester B) in a volume ratio of 25:55:20. The esters A and B had been prepared according to the disclosure of U.S. patent application Ser. No. 470,629. This ester mixture, hereinafter called "mixture 25/55/20," is suited for the same application as that described in connection with Example III. Its properties are set out in Table IV in comparison with those of its starting components. The said ester mixtures possess besides a high viscosity at 98.9° C. a low viscosity at low temperature and a remarkable lubricating efficiency.

TABLE III

| | $d_4^{20}$ | Viscosity in cst. in °C. | | | Setting point, °C. | Flame point, °C. | Welding value, kg |
|---|---|---|---|---|---|---|---|
| | | 98.9 | 37.8 | VI | | | |
| Bis-(isodecyl)-adipate | 0.922 | 3.66 | 15.2 | 144 | −68 | 230 | 150/160 |
| Ester III | 1.02 | 23.3 | 125.5 | 146 | −50 | 275 | 170/180 |
| Mixture 55/45 | 0.969 | 7.92 | 43.05 | 144 | −62 | 239 | 160/170 |

TABLE IV

| | $d_4^{20}$ | Viscosity in cst. in °C. | | | | Setting point, °C. | Flame point, °C |
|---|---|---|---|---|---|---|---|
| | | 98.9 | 37.8 | −54 | VI | | |
| Ester VI | 1.001 | 27.0 | 241.1 | | 127 | −32 | 295 |
| Ester A | 1.038 | 3.9 | 13.5 | 7,490 | 203 | −71 | 233 |
| Ester B | 1.026 | 4.1 | 13.5 | 3,460 | 218 | −76 | 210 |
| Mixture 25/55/20 | 1.023 | 6.02 | 23.43 | 9,750 | 178 | −70 | 235 |

We claim:

1. A liquid material comprising lubricating amount of a diorthosilicic acid ester having one of the formulae:

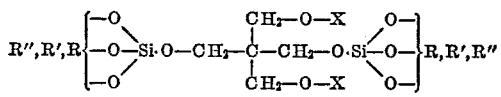

and

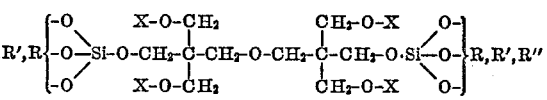

wherein X represents saturated acyl of more than two carbon atoms, R represents a polyoxyalkyleneglycol-ether radical having 1 to 4 etheroxygen atoms, R' represents alkyl having more than 3 carbon atoms, and R" represents a radical from the group consisting of monopentaerythrite-tri-carboxylic acid-ester radicals and dipentaerythrite-penta-carboxylic acid ester radicals.

2. A liquid material according to claim 1, wherein said diorthosilicic acid ester is pentaerythrite-di-3,5,5-trimethylhexanate - diorthosilicic acid - hexaisodecyl-ester in which trimethylhexanate constitutes an isononate group.

3. A liquid material according to claim 1, wherein said diorthosilicic acid ester is pentaerythrite-di-3,5,5-trimethylhexanate-diorthosilicic acid hexa-{diethyleneglycol-n-butylether}-ester in which trimethylhexanate constitutes an isononate group.

4. A liquid material according to claim 1, wherein said diorthosilicic acid ester is pentaerythrite-di-3,5,5-trimethylhexanate - diorthosilicic acid-tri-{diethyleneglycol-n-butylether}-tri-{isodecyl}-ester in which trimethylhexanate constitutes an isononate group.

5. A liquid material according to claim 1, wherein said diorthosilicic acid ester in pentaerythrite-di-3,5,5-trimethylhexanate - diorthosilicic acid-di-{pentaerythrite-tri-(3,5,5-trimethylhexanate)} - tetra - {diethyleneglycol-n-butylether}-ester in which trimethylhexanate constitutes an isononate group.

6. A liquid material according to claim 1, wherein said diorthosilicic acid ester is pentaerythrite-di-3,5,5-trimethylhexanate-diorthosilicic acid-mono-{pentaerythrite-tri-(3,5,5 - trimethylhexanate)}-penta-{diethyleneglycol-n-butylether}-ester in which trimethylhexanate constitutes an isononate group.

7. A liquid material according to claim 1, wherein said diorthosilicic acid ester is pentaerythrite-di-3,5,5-trimethylhexanate-diorthosilicic acid-mono-{pentaerythrite-tri - (3,5,5 - trimethylhexanate)}-tri-{diethyleneglycol-n-butylether}-di-(isodecyl)-ester in which trimethylhexanate constitutes an isononate group.

8. A liquid material according to claim 1, wherein said diorthosilicic acid ester is pentaerythrite-di-3,5,5-trimethylhexanate-diorthosilicic acid-mono-{pentaerythrite-tri-(3,5,5-trimethylhexanate)} - tri-(isodecyl)-di-(diethyleneglycol-n-butylether)-ester in which trimethylhexanate constitutes an isononate group.

9. A lubricant comprising at least 25% by volume of a diorthosilicic acid ester according to claim 1, admixed with another liquid lubricant.

10. A lubricant according to claim 9, wherein said other lubricant is a member selected from the group consisting of lower viscosity diorthosilicic acid esters, organo silicon compounds having differing structure, dibasic esters, phosphoric acid esters, polyphenyl ether oils, mineral oils, and mixtures thereof.

References Cited

UNITED STATES PATENTS

| | | | |
|---|---|---|---|
| 2,048,799 | 7/1936 | Lawson | 260—448.8 XR |
| 2,441,066 | 5/1948 | Hanford | 260—46.5 |
| 2,566,365 | 9/1951 | Pedlow et al. | 260—448.8 |
| 2,630,446 | 3/1953 | Gresham | 260—448.8 |
| 2,717,242 | 9/1955 | Foehr | 252—49.6 |
| 2,909,551 | 10/1959 | Shibe | 252—49.6 XR |

OTHER REFERENCES

Barnes et al.: "Lubrication Engineering," August 1957, pp. 454 to 458.

DANIEL E. WYMAN, Primary Examiner.

W. CANNON, Assistant Examiner.

U.S. Cl. X.R.

260—448.8